(12) United States Patent
Honeck et al.

(10) Patent No.: US 6,489,888 B1
(45) Date of Patent: Dec. 3, 2002

(54) USING SIGNAL STRENGTH TO IDENTIFY TIRE POSITION

(75) Inventors: Brian S. Honeck; Thomas R. Olson; Emil Ureel, all of Holland, MI (US)

(73) Assignee: Johnson Controls Technology Company, Plymouth, MI (US)

( * ) Notice: Subject to any disclaimer, the term of this patent is extended or adjusted under 35 U.S.C. 154(b) by 0 days.

(21) Appl. No.: 09/896,528

(22) Filed: Jun. 29, 2001

(51) Int. Cl.$^7$ ............................................. B06C 23/00
(52) U.S. Cl. ...................... 340/442; 340/447; 340/446; 340/448; 340/445; 340/10.4; 73/146.5; 73/146.4; 73/146.2
(58) Field of Search ................................ 340/442, 447, 340/446, 448, 10.4, 445; 73/146.5, 146.4, 146.2

(56) References Cited

U.S. PATENT DOCUMENTS

| | | | |
|---|---|---|---|
| 5,461,385 A | 10/1995 | Armstrong | 342/42 |
| 5,559,484 A | * 9/1996 | Nowicki et al. | 340/447 |
| 5,600,301 A | 2/1997 | Robinson, III | 340/447 |
| 5,602,524 A | 2/1997 | Mock et al. | 340/447 |
| 5,612,671 A | 3/1997 | Mendez et al. | 340/447 |
| 5,661,651 A | 8/1997 | Geschke et al. | 364/424.034 |
| 5,731,754 A | * 3/1998 | Lee, Jr. et al. | 340/447 |
| 5,764,138 A | 6/1998 | Lowe | 340/447 |
| 5,774,047 A | 6/1998 | Hensel, IV | 340/442 |
| 5,808,190 A | 9/1998 | Ernst | 73/146.5 |
| 5,825,286 A | * 10/1998 | Coulthard | 340/447 |
| 5,838,229 A | 11/1998 | Robinson, III | 340/442 |
| 5,880,363 A | 3/1999 | Meyer et al. | 73/146.5 |
| 5,883,305 A | * 3/1999 | Jo et al. | 73/146.5 |
| 5,924,055 A | 7/1999 | Hattori | 702/138 |
| 6,018,993 A | 2/2000 | Normann et al. | 73/146.5 |
| 6,034,597 A | 3/2000 | Normann et al. | 340/447 |
| 6,043,738 A | 3/2000 | Stewart et al. | 340/447 |
| 6,112,587 A | 9/2000 | Oldenettel | 73/146.5 |
| 6,137,421 A | 10/2000 | Dykema | 340/825.69 |
| 6,181,241 B1 | 1/2001 | Normann et al. | 340/447 |
| 6,204,758 B1 | 3/2001 | Wacker et al. | 340/444 |
| 6,218,936 B1 | * 4/2001 | Imao | 340/447 |
| 6,259,361 B1 | 7/2001 | Robillard et al. | 340/447 |
| 6,278,363 B1 | 8/2001 | Bezek et al. | 340/442 |
| 6,292,096 B1 | 9/2001 | Munch et al. | 340/445 |
| 6,340,930 B1 | 1/2002 | Lin | 340/447 |
| 6,362,731 B1 | 3/2002 | Lill | 340/445 |
| 6,369,703 B1 | 4/2002 | Lill | 340/447 |
| 6,384,720 B1 | 5/2002 | Juzswik et al. | 340/442 |
| 6,385,511 B1 | 5/2002 | Fondeur et al. | 701/1 |
| 6,417,766 B1 | 7/2002 | Starkey | 340/447 |
| 2002/0067285 A1 | 6/2002 | Lill | 340/870.11 |
| 2002/0070876 A1 | 6/2002 | Hirohama et al. | 340/870.07 |

FOREIGN PATENT DOCUMENTS

EP          0 931 679 A1    7/1999    ........... B60C/23/04

\* cited by examiner

*Primary Examiner*—Jeffery Hofsass
*Assistant Examiner*—Tai T. Nguyen
(74) *Attorney, Agent, or Firm*—Foley & Lardner

(57) ABSTRACT

A system for identifying the position of a tire on a vehicle based on wireless messages received from the tire includes a receiver circuit, a signal strength circuit, a memory, and a processing circuit. The receiver circuit is configured to receive the wireless messages. The signal strength circuit is configured to determine the signal strengths of the wireless messages. The memory is configured to store a predetermined frequency distribution. The processing circuit is configured to provide a frequency distribution of the wireless messages based on the signal strengths and to compare the frequency distribution to the predetermined frequency distribution to determine the position of the tire on the vehicle.

20 Claims, 3 Drawing Sheets

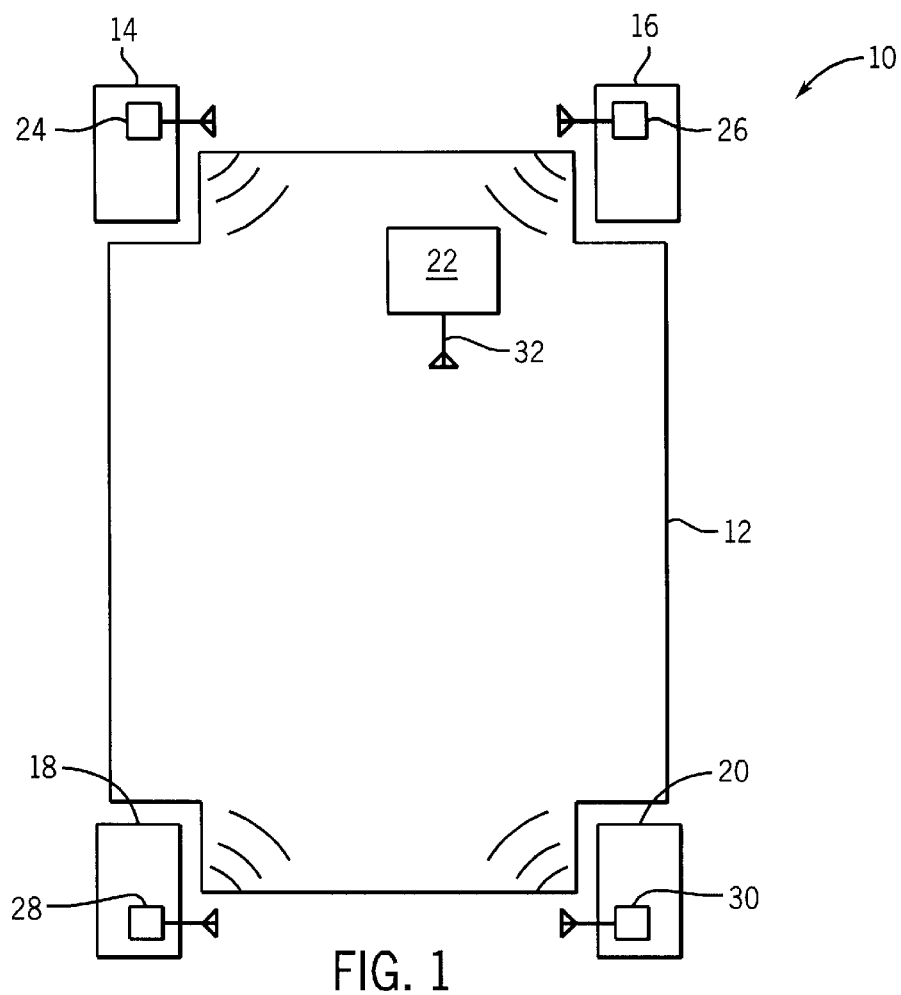
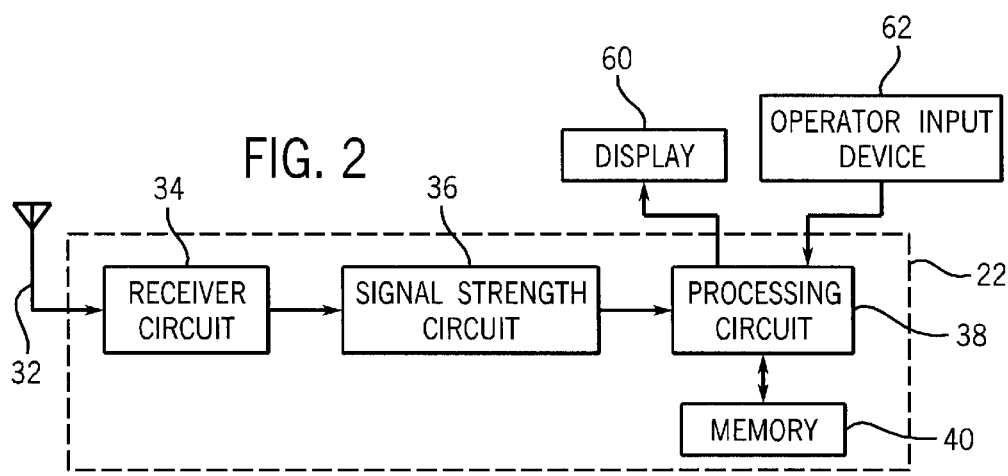

USING SIGNAL STRENGTH TO IDENTIFY TIRE POSITION

BACKGROUND OF THE DISCLOSURE

Increasing attention is being given to monitoring the pressure of tires on a vehicle while the vehicle is in motion. A typical tire pressure monitor includes a plurality of transmitter circuits coupled to each of a plurality of tires on a vehicle, each transmitter circuit including a tire pressure sensor inserted into the tire and a radio frequency transmitter. The transmitter circuits sense tire pressure and generate radio frequency signals in the form of a message, the message including a tire identification number and the sensed tire pressure. The tire pressure monitor also includes a receiver circuit coupled to the vehicle for receiving the radio frequency signals. The receiver circuit processes the signals by, for example, displaying the tire pressures of each tire, providing warnings when the tire pressures are outside predetermined parameters, etc.

One challenge in tire pressure monitoring is identifying the location of the tires on the vehicle (e.g., left front, left rear, right rear, etc.). As tires are changed or rotated, the tire locations must be updated. In order to display the proper tire pressure to the driver for each tire, the locations of the tires must be known.

According to one prior system, signals coming via various reception antennas are processed not individually but rather together, and evaluated as to signal intensity for purposes of allocation to a specific wheel. The signals are summed, and the intensity of the summed signal is determined and compared to the intensity of a summed signal constituted by temporarily switching only N–1 reception antennas to the input of the receiver. The disconnected reception antenna is changed cyclically. According to the teachings of this system, the antenna whose deactivation results in the greatest intensity loss in the summed signal is normally that antenna which is located closest to the transmitting wheel electronics package, and thus receives the signal with the greatest field strength.

One drawback of this system is that some signals may be received with a higher signal strength at a reception antenna which is not closest to the position of the transmitting wheel, due to multipath, interference caused by spinning tires and surrounding objects, and other disturbances. This can lead to inaccurate results, which is disadvantageous in a system where it is very important to avoid providing misleading tire pressure data to the operator. Furthermore, this system requires multiple reception antennas, and, therefore, cannot be used with a tire pressure monitoring system having only one antenna.

Accordingly, what is needed is an accurate system and method for identifying tire position that does not require manual programming. Further, what is needed is a system and method usable on tire monitoring systems having one antenna or a plurality of antennas. Further still, what is needed is a system and method for passively identifying tire position that is more accurate and reliable than prior systems. Further yet, what is needed is a system that can detect tire position universally, i.e., without the need for a specialized transmission protocol. The teachings hereinbelow extend to those embodiments which fall within the scope of the appended claims, regardless of whether they accomplish one or more of the above-mentioned needs.

SUMMARY OF EXEMPLARY EMBODIMENTS

According to one exemplary embodiment, a method of identifying the position of a tire on a vehicle includes receiving a plurality of wireless messages from a transmitter associated with the tire and determining the signal strengths of the received wireless messages. The method further includes providing a frequency distribution of the wireless messages based on the signal strengths and comparing the frequency distribution to a predetermined frequency distribution to determine the position of the tire on the vehicle.

According to another exemplary embodiment, a system for identifying the position of a tire on a vehicle based on wireless messages received from the tire includes a receiver circuit, a signal strength circuit, a memory, and a processing circuit. The receiver circuit is configured to receive the wireless messages. The signal strength circuit is configured to determine the signal strengths of the wireless messages. The memory is configured to store a predetermined frequency distribution. The processing circuit is configured to provide a frequency distribution of the wireless messages based on the signal strengths and to compare the frequency distribution to the predetermined frequency distribution to determine the position of the tire on the vehicle.

According to yet another exemplary embodiment, a system for determining the position of a tire on a vehicle includes a means for receiving a plurality of transmitted messages from a transmitter associated with the tire. The system further includes a means for determining the signal strength of the plurality of transmitted messages and a means for providing a pattern of the messages based on the signal strengths of the plurality of transmitted messages. The system further includes a means for determining the position of the tire on the vehicle based on the pattern of the messages and a stored pattern of signal strength values.

BRIEF DESCRIPTION OF THE DRAWINGS

The invention will become more fully understood from the following detailed description, taken in conjunction with the accompanying drawings, wherein like reference numerals refer to like parts, and in which:

FIG. 1 is a schematic diagram of a tire monitoring circuit having a system for identifying the position of a tire on a vehicle, according to an exemplary embodiment;

FIG. 2 is a block diagram of the system for identifying the position of a tire in a vehicle of FIG. 1, according to an exemplary embodiment;

DETAILED DESCRIPTION OF EXEMPLARY EMBODIMENTS

Figure 3:
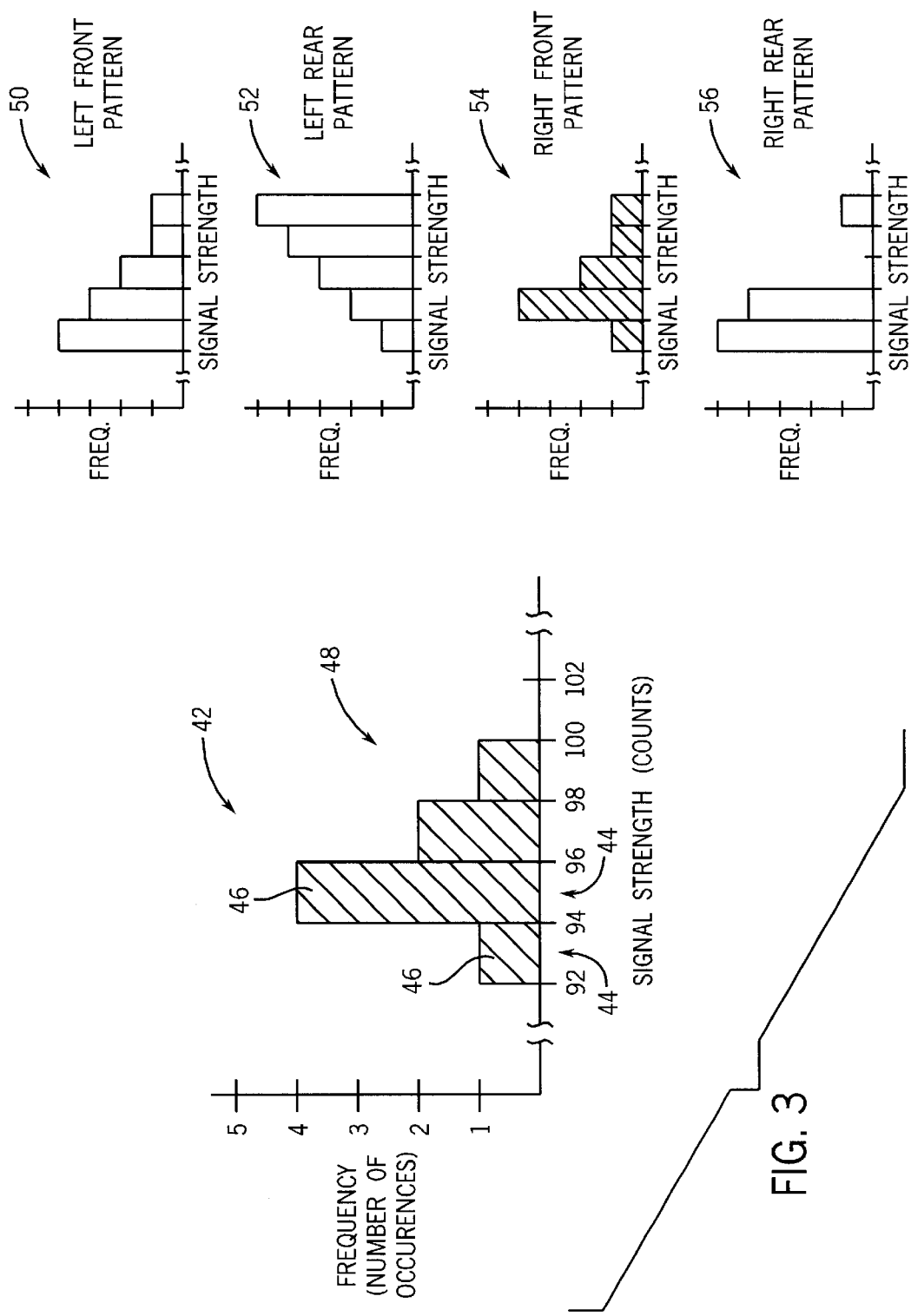
FIG. 3 is a schematic diagram illustrating a step of comparing the frequency distribution to one or more predetermined frequency distributions, according to an exemplary embodiment.

Referring first to FIG. 1, a tire monitoring system 10 is illustrated on a vehicle 12. Tire monitoring system 10 is configured to monitor one or more characteristics of one or more tires 14, 16, 18, 20, such as, tire pressure, temperature, alignment, tread wear, etc. Tire monitoring system 10 is a wireless system, which utilizes radio frequency, infrared, or other wireless signal transmission technology to provide tire characteristic data from tires 14–20 to a tire monitor 22. Thus, tire monitoring system 10 includes a plurality of tire sensors 24, 26, 28, 30, each coupled to one of tires 14–20. Tire sensors 24–30 are configured to sense one or more characteristics of tires 14–20, respectively, and to provide tire characteristic data wirelessly to tire monitor 22.

Tire monitor 22 includes a single antenna 32 in this exemplary embodiment for receiving wireless messages from one or more of tire sensors 24–30. In alternative embodiments, multiple antennas may be coupled to tire monitor 22 for receiving wireless messages at a plurality of locations on vehicle 12. For example, tire monitor 22 may include four antennas, one disposed in the vicinity of each of tire sensors 24–30.

Tire monitor 22 is configured to receive wireless messages from one or more of tire sensors 24–30, to monitor the tire characteristic data on the wireless messages, and to selectively display tire characteristic data to an operator of vehicle 12. For example, tire monitor 22 may receive tire pressure data from tire sensors 24–30 and may monitor the tire pressure data to determine if the tire pressure of any of tires 14–20 is greater than or less than predetermined maximum and/or minimum thresholds and may provide a display and associated alarm (visible, audible, etc.) to the operator of vehicle 12. The alarm indicates to the operator that maintenance of the tire causing the alarm may be needed.

Each of tire sensors 24–30 is configured to transmit tire identification data, which may be any type of message uniquely identifying the tire. For example, a tire identification of "000f", in hexadecimal representation, may indicate a first tire, while a tire identification of "01af" may identify a different tire. Tire monitor 22 is configured to receive the tire identification data on the wireless message and to identify a location of the tire on vehicle 12, to provide more meaningful tire data to the operator of vehicle 12. For example, tire monitor 22 may associate a tire identification of "000f" with the vehicle position of "left front", and display the tire pressure data associated with tire "000f" along with a display indicating that the tire is the left front tire, such as, "LF 28". In this manner, useful information can be provided to the operator of vehicle 12 to determine alarm conditions, such as, "LF LOW", "RR LOW", etc.

Referring now to FIG. 2, a block diagram of tire monitor 22 is illustrated according to an exemplary embodiment. Tire monitor 22 includes a receiver circuit 34, a signal strength circuit 36, a processing circuit 38, and a memory 40. Circuits 34, 36, and 38 and memory 40 are illustrated in block form to indicate that these elements are functional units which may be embodied in hardware circuitry, software, or other processing elements. For example, circuits 34, 36, and 38 and memory 40 may be disposed on one or more integrated circuits, and may be part of a system-on-chip (SOC), and may further include programmable logic, microprocessors, microcontrollers, or other control circuitry. Furthermore, memory 40 may include volatile memory portions and non-volatile memory portions, and may include random access memory, read-only memory, and other memory types.

Receiver circuit 34 is configured to receive wireless messages via antenna 32 from tire sensors 24–30. Portions of receiver circuit 34 may be duplicated to receive wireless messages from a plurality of antennas simultaneously. Tire sensors 24–30 are configured to transmit blocks of wireless messages, each block including eight identical frames of data, in this exemplary embodiment. Due to interference, multipath, and other sources of error, tire sensors 24–30 send duplicative data in each of the frames of each block. Tire sensors 24–30 are configured to transmit blocks of data periodically, wherein the rate of transmissions is greater when the vehicle is in motion than when the vehicle is idle. For example, when the vehicle is in motion, a block of data may be sent from each of tire sensors 24–30 at a rate of one transmission per 60 seconds, and when vehicle 12 is idle, tire sensors 24–30 are each configured to send a block of data at a rate of one transmission per 60 minutes. Receiver circuit 34 may include amplifying circuitry, filtering circuitry, buffering circuitry, demodulating circuitry, and/or other circuit elements necessary to receive wireless messages from tire sensors 24–30 via antenna 32.

Signal strength circuit 36 is coupled to receiver circuit 34 and is configured to determine the signal strengths of the wireless messages. In this exemplary embodiment, signal strength circuit 36 generates a received signal strength indicator (RSSI) for each frame of each block of data. In particular, the RSSI of the first bit in each frame of each block is used to determine the RSSI for the frame. If additional signal strength values are required, signal strength circuit 36 may be configured to measure a plurality of signal strength values for each frame. Signal strength circuit 36 may measure signal strength values for one or more of the first bit of each frame, the last bit of each frame, or any other bits in the frame or message.

Signal strength circuit 36 uses RSSI in this exemplary embodiment, but may alternatively use other measures of signal strength. RSSI is calculated in this exemplary embodiment by demodulating the selected bit or bits of the frame or message. The demodulated bit or bits are associated with an RF power (i.e., signal strength), and are digitized with an analog-to-digital (A/D) converter. The output of the A/D converter provides the RSSI counts of the sample. RSSI may be generated for either frequency-modulated (FM) or amplitude-modulated (AM) signals.

Processing circuit 38 is configured to store the signal strengths provided by signal strength circuit 36 in memory 40. Processing circuit 38 is configured to identify the positions of the tires on vehicle 12 (e.g., left front, right front, right rear, left rear) based on the signal strengths of the wireless messages. In one exemplary embodiment, processing circuit 38 is configured to provide a pattern of the signal strengths (e.g., a statistical distribution such as, a frequency distribution), to compare the pattern of the signal strengths to one or more predetermined patterns (e.g., frequency distributions) stored in memory 40 and to determine the position of the tire on the vehicle based on the comparison. The frequency distributions may include one or more counts of signal strengths that provide sufficient data to correlate a new frequency distribution with one of a plurality of stored frequency distributions. In this example, frequency distributions include the number of samples per bin. This advantageous feature of this exemplary embodiment will now be described with reference to FIG. 3.

Referring to FIG. 3, a histogram 42 illustrating the frequency distribution stored by processing circuit 38 and memory 40 is illustrated. In this simplified example, only eight signal strength samples are illustrated, but in alternative embodiments, the accuracy of tire monitor 22 can be improved by providing a frequency distribution having sample sizes of tens, hundreds, or thousands of signal strength samples. Each of the signal strength samples provided in histogram 42 is associated with the same tire identification data. In this exemplary embodiment, processing circuit 38 is configured to generate a frequency distribution or count pattern by sorting the received messages by signal strength value into bins of 2 RSSI counts ranging from approximately 60 counts to 180 counts. Each of bins 44 includes a count (represented by bars 46 in histogram 42) of signal strength values falling within the range of the bin values. The resulting frequency distribution 48 or pattern provides an indication of the tire position on the vehicle, since the signal strengths of the messages are affected by the positions of tire sensors 24–30 relative to antenna 32 of tire monitor 22 (FIG. 1). The distance, angle, and any interfering objects, such as, the vehicle frame, etc. affect the frequency distribution for each tire position. Also, various conductive shielding shapes can be implemented in or around tires 14–20 (e.g., in the wheel wells) to create desired or unique frequency distribution patterns at each of tires 14–20.

Once a predetermined number of signal strength samples have been acquired by processing circuit 38 (e.g., as a number of samples, a number of samples per wavelength of the wireless message, etc.), or if signal strengths have been acquired for a predetermined period of time, processing circuit 38 compares pattern 48 to one or more predetermined frequency distributions or patterns 50, 52, 54, 56 to determine the position of the tire in the vehicle. Predetermined patterns 50–56 are stored in memory 40, for example, during manufacture of vehicle 12. Predetermined patterns 50–56 may be generated based on a testing phase during manufacture, and may subsequently be updated during the life of vehicle 12. Each of patterns 50, 52, 54, 56 represents a typical pattern of signal strength samples of wireless messages received from the left front vehicle location (pattern 50), the left rear vehicle location (pattern 52), the right front vehicle location (pattern 54), and the right rear vehicle location (pattern 56).

In comparing pattern 48 to predetermined patterns 50–56, processing circuit 38 may compare one characteristic of the patterns or may compare multiple characteristics of the patterns. These characteristics may include: mean, variance, the count or bin range from the largest count or bin to the smallest count or bin, position of mode or highest peak, position of mode relative to minimum, maximum, or mean, squared difference of each bar between pattern 48 (i.e., an incoming pattern) and each of predetermined patterns 50–56 to find the predetermined pattern having least squared difference from the incoming pattern, etc. Other characteristics may be compared to determine the best match between pattern 48 and patterns 50–56. In this exemplary embodiment, pattern 48 most closely corresponds to pattern 54. Accordingly, processing circuit 38 determines that the position of the tire identified by the wireless messages in pattern 48 is the right front tire.

Advantageously, tire monitor 22 does not require a specialized protocol to identify the position of the tires. The frequency distribution patterns can be improved by increasing the number of bins, decreasing the size of the bins, or increasing the number of signal strength samples in each frequency distribution.

Referring again to FIG. 2, processing circuit 38 is configured to communicate with a display 60 and an operator input device 62. Processing circuit 38 may be configured to generate display signals for display of tire characteristic data along with the position of the tire associated with the tire characteristic data on display 60. Operator input device 62, which may include a button, switch, touch screen, voice recognition device, etc. may be used by the operator to select characteristic data to be displayed from memory 40 via processing circuit 38. Operator input device 62 may further be used to calibrate tire monitor 22 initially, as will be described in exemplary form in FIG. 4 hereinbelow.

In an exemplary application, when a new tire is provided to vehicle 12, or tires 14–20 have been rotated, processing circuit 38 is configured to automatically detect the change and adjust the display of tire characteristics accordingly. Processing circuit 38 receives signal strengths of wireless messages from each of the tires in their new positions. Processing circuit 38 is configured to provide frequency distributions for each of tire sensors 24–30 associated with tires 14–20, based on the tire identification data within the wireless messages. Processing circuit 38 is further configured to compare each new frequency distribution to the predetermined patterns stored in memory 40 to determine the new positions of the tire or tires that have changed position, or the new tire. Processing circuit 38 is then configured to store the new tire positions in memory 40, and/or provide the new tire positions on display 60.

Figure 4:
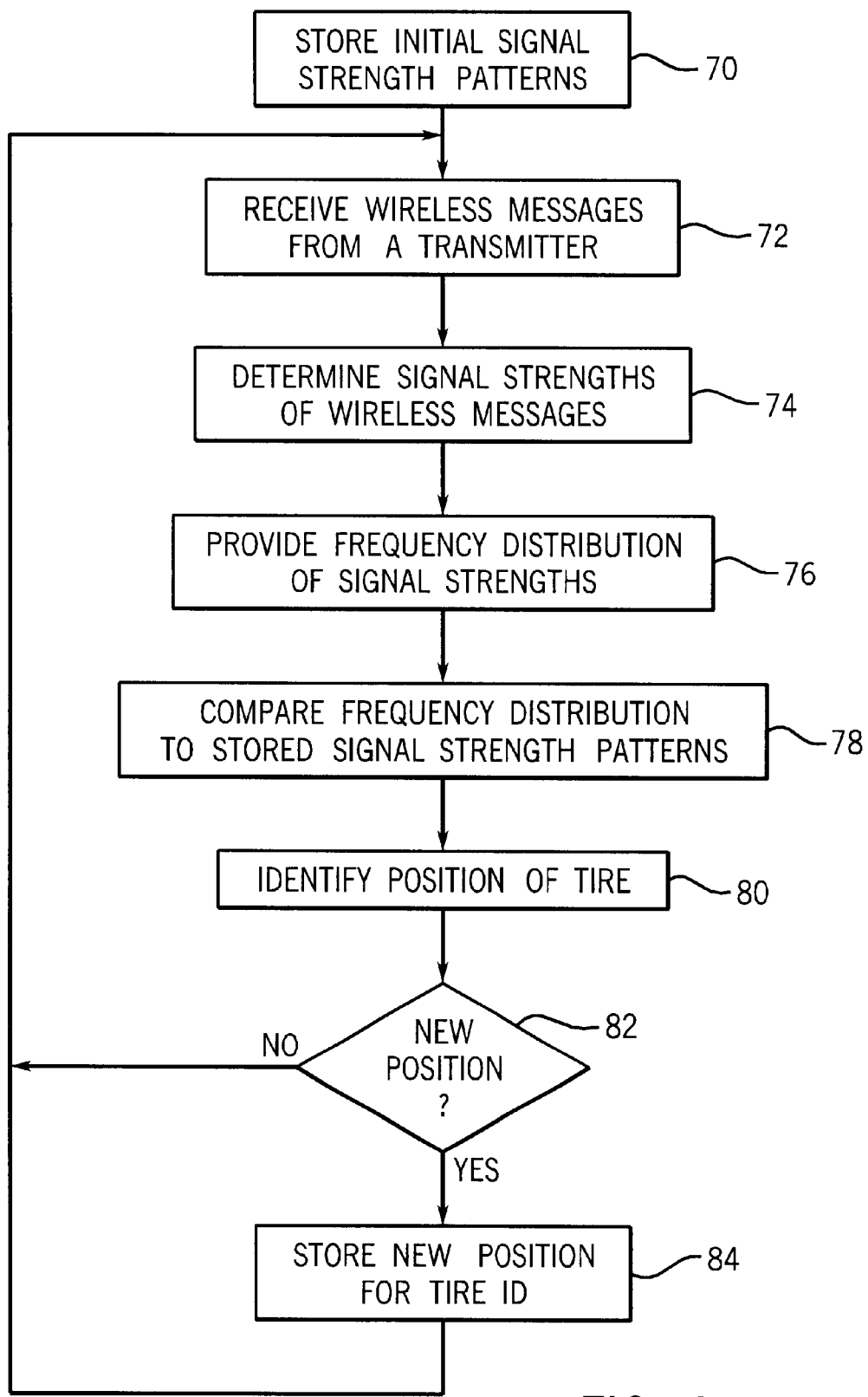
FIG. 4 is a flowchart of a method of identifying the position of a tire in a vehicle, according to an exemplary embodiment.

Referring now to FIG. 4, an exemplary method of identifying the position of a tire in a vehicle will now be described. It is understood that one or more of the steps in this exemplary method may be eliminated or rearranged in various embodiments. At step 70, initial signal strength patterns are stored in memory 40 of tire monitor 22. As mentioned, the initial or predetermined signal strength patterns may be provided by testing of the vehicle 12 during manufacture, Alternatively, the purchaser of a new vehicle or the purchaser of a new tire monitoring system 10 may user operator input device 62 to provide an initial calibration procedure to train tire monitor to store the predetermined signal strength patterns in memory 40. For example, tire monitor 22 may display a tire identification on display 60, and the operator may input the tire position associated with that tire identification using operator input device 62, wherein the tire identification can be read from a label affixed to tire sensors 24–30 on their associated tires. Various other techniques are contemplated for storing initial signal strength patterns in step 70, including updating the stored signal strength patterns during the lifetime of the system.

At step 72, after calibration or training in step 70, tire monitor 22 enters an operation phase during which wireless messages are received from transmitters associated with tire sensors 24–30. At step 74, the signal strengths of the wireless messages are determined, for example, using RSSI techniques and signal strength circuit 36. At step 76, processing circuit 38 is configured to provide a frequency distribution or pattern of signal strength samples, for example, by saving the incoming signal strengths in memory 40.

When a sufficient number of signal strength samples have been received for a given tire identification, or when a predetermined period of time has passed between prior comparison steps, such as step 78, the frequency distribution for one or more of tire sensors 24–30 is compared with signal strength samples stored in step 70. One or more characteristics of the frequency distributions may be compared in step 78. In step 80, the position of the tire having the tire identification of the frequency distribution compared in step 78 is identified. At step 82, if a change in position is detected, the new position is stored at step 84 in memory 40 for the given tire identification. Optionally, the operator may receive an indication on display 60 that a new position for a tire ID has been identified, either in textual indication, audible indication, via a light-emitting diode or via a graphical or pictorial image (e.g., an icon). The method returns to step 72 to repeat the process for additional incoming wireless messages.

Advantageously, this exemplary method does not require manual intervention to identify tire positions, since tire monitor 22 automatically receives and processes wireless messages from tire sensors 24–30.

While the exemplary embodiments illustrated in the FIGURES and described above are presently preferred, it should be understood that these embodiments are offered by way of example only. For example, various patterns of signal strength values may be compared to identify tire positions, other than or in addition to frequency distributions. Further, the teachings herein may be applied to various types of vehicles, including cars, trucks, all-terrain vehicles, construction vehicles, etc. Accordingly, the present invention is not limited to a particular embodiment, but extends to various modifications that nevertheless fall within the scope of the appended claims.

What is claimed is:

1. A system for identifying the position of a tire on a vehicle based on wireless messages received from the tire, comprising:
   a receiver circuit configured to receive the wireless messages;
   a signal strength circuit configured to determine the signal strengths of the wireless messages;
   a memory configured to store a predetermined frequency distribution; and
   a processing circuit configured to provide a frequency distribution of the wireless messages based on the signal strengths, to compare the frequency distribution to the predetermined frequency distribution, and to determine the position of the tire on the vehicle based on the comparison.

2. The system of claim 1, wherein the wireless messages comprise tire pressure data, wherein the processing circuit is configured to generate display signals for display of the tire pressure data and the position of the tire.

3. The system of claim 1, wherein the memory includes a plurality of predetermined frequency distributions, each of the predetermined frequency distributions corresponding to one of a plurality of tire positions.

4. The system of claim 1, wherein each of the plurality of wireless messages includes tire identification data, wherein the processing circuit is configured to sort the wireless messages by the tire identification data.

5. The system of claim 1, wherein the signal strength circuit is configured to determine the received signal strength indicator of the wireless messages.

6. The system of claim 1, wherein the signal strength circuit is configured to determine a plurality of signal strengths for each wireless message.

7. The system of claim 1, wherein the processing circuit is configured to compare a plurality of characteristics of the frequency distribution with a corresponding plurality of characteristics of the predetermined frequency distribution.

8. The system of claim 1, wherein the processor circuit is configured to determine if the tire has changed position on the vehicle based on the comparison of the frequency distribution to the predetermined frequency distribution.

9. A method of identifying the position of a tire on a vehicle, comprising:
   receiving a plurality of wireless messages from a transmitter associated with the tire;
   determining the signal strengths of the received wireless messages;
   providing a frequency distribution of the wireless messages based on the signal strengths; and
   comparing the frequency distribution to a predetermined frequency distribution to determine the position of the tire on the vehicle.

10. The method of claim 9, wherein the wireless messages each comprise tire pressure data, further comprising generating display signals for display of the tire pressure data and the position of the tire.

11. The method of claim 9, wherein each of the plurality of wireless messages includes tire identification data, wherein the step of providing a frequency distribution includes sorting the wireless messages by the tire identification data.

12. The method of claim 9, wherein the step of determining the signal strengths includes calculating a received signal strength indicator for each wireless message.

13. The method of claim 12, wherein the step of determining the signal strengths includes measuring the received signal strength indicator for a first bit of each wireless message.

14. The method of claim 9, wherein the step of determining the signal strengths of the received wireless messages includes determining a plurality of signal strengths for each wireless message.

15. The method of claim 9, wherein the step of comparing includes comparing a plurality of characteristics of the frequency distribution with a corresponding plurality of characteristics of the predetermined frequency distribution.

16. The method of claim 9, further comprising determining if a tire has changed position on the vehicle based on the step of comparing.

17. A system for determining the position of a tire on a vehicle, comprising:
   means for receiving a plurality of transmitted messages from a transmitter associated with the tire;
   means for determining the signal strength of the plurality of transmitted messages;
   means for providing a frequency distribution of the messages based on the signal strengths of the plurality of transmitted messages; and
   means for determining the position of the tire on the vehicle based on the frequency distribution of the messages and a stored frequency distribution of signal strength values.

18. The system of claim 17, wherein the means for determining includes means for comparing a plurality of characteristics of the frequency distribution to the corresponding plurality of characteristics of the stored frequency distribution.

19. The system of claim 18, wherein the means for determining the signal strength determines a plurality of signal strengths for each message.

20. The system of claim 17, further comprising means for determining if a tire has changed position on the vehicle and for providing a visual indicia of the tire position change.

* * * * *